(12) United States Patent
Lin et al.

(10) Patent No.: US 11,773,222 B2
(45) Date of Patent: Oct. 3, 2023

(54) CURABLE COMPOSITION AND ELECTRONIC DEVICE EMPLOYING THE SAME

(71) Applicant: INDUSTRIAL TECHNOLOGY RESEARCH INSTITUTE, Hsinchu (TW)

(72) Inventors: Chih-Hao Lin, New Taipei (TW); Yueh-Chuan Huang, Jhudong Township (TW); Kai-Chi Chen, Zhubei (TW); Wen-Bin Chen, Zhudong Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 161 days.

(21) Appl. No.: 17/539,454

(22) Filed: Dec. 1, 2021

(65) Prior Publication Data

US 2023/0123048 A1 Apr. 20, 2023

(30) Foreign Application Priority Data

Aug. 25, 2021 (TW) .................................. 110131442

(51) Int. Cl.
*C08G 77/14* (2006.01)
*C08K 5/17* (2006.01)
(Continued)

(52) U.S. Cl.
CPC ........... *C08G 77/14* (2013.01); *C08G 77/045* (2013.01); *C08K 5/17* (2013.01); *C08K 5/521* (2013.01); *C08L 83/06* (2013.01); *C08L 2203/20* (2013.01)

(58) Field of Classification Search
CPC ....... C08G 77/14; C08L 83/06; C09D 183/06; H01L 33/56
See application file for complete search history.

(56) References Cited

U.S. PATENT DOCUMENTS 6,806,509 B2 10/2004 Yoshino et al.
8,197,723 B2 6/2012 Roitman et al.
(Continued)

FOREIGN PATENT DOCUMENTS

CN 106883613 A 6/2017
JP 2011-38109 A 2/2011
(Continued)

OTHER PUBLICATIONS

Taiwanese Notice of Allowance and Search Report for Taiwanese Application No. 110131442, dated Jul. 1, 2022.
(Continued)

*Primary Examiner* — Kuo Liang Peng
(74) *Attorney, Agent, or Firm* — Birch, Stewart, Kolasch & Birch, LLP

(57) ABSTRACT

A curable composition and an electronic device employing the same are provided. The curable composition includes 100 parts by mole of a first siloxane compound represented by Formula (I)

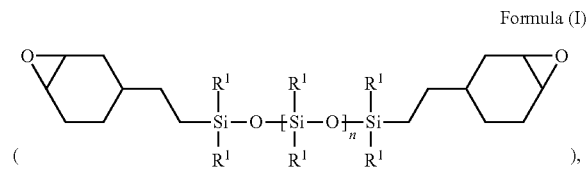

Formula (I)

wherein n is 8 to 232, wherein $R^1$ is independently $C_{1\text{-}3}$ alkyl group; 1 to 15 parts by mole of a second siloxane compound represented by Formula (II)

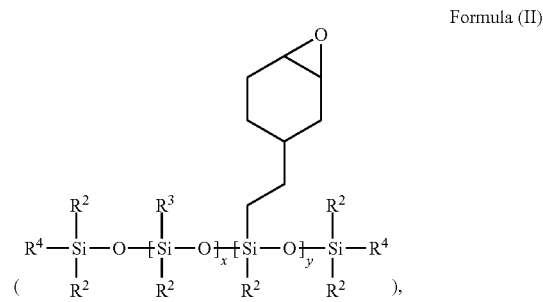

Formula (II)

wherein x≥2, y≥2, and x/y is between 0.1 and 3, and $R^2$, $R^3$ and $R^4$ are independently $C_{1\text{-}3}$ alkyl group; 1 to 15 parts by mole of a third siloxane compound represented by Formula (III)

Formula (III)

(Continued)

and 90 to 250 parts by mole of a curing agent represented by Formula (IV)

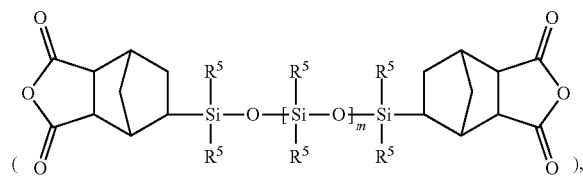

Formula (IV)

wherein m is 7 to 230, wherein $R^5$ is independently $C_{1-3}$ alkyl group.

9 Claims, 1 Drawing Sheet

(51) Int. Cl.
  *C08G 77/04* (2006.01)
  *C08L 83/06* (2006.01)
  *C08K 5/521* (2006.01)

(56) References Cited

U.S. PATENT DOCUMENTS

| | | | |
|---|---|---|---|
| 8,440,774 | B2 | 5/2013 | Lin et al. |
| 8,710,158 | B2 | 4/2014 | Ueno et al. |
| 9,540,488 | B1 * | 1/2017 | Lin ................ E21B 49/005 |
| 2005/0123776 | A1 | 6/2005 | Yoshikawa |
| 2008/0124822 | A1 | 5/2008 | Yoshikawa |
| 2013/0148304 | A1 | 6/2013 | Kitagawa et al. |
| 2013/0241390 | A1 | 9/2013 | Guschl |
| 2019/0330411 | A1 | 10/2019 | Agrawal et al. |

FOREIGN PATENT DOCUMENTS

| | | |
|---|---|---|
| TW | 201425477 A | 7/2014 |
| TW | 201918525 A | 5/2019 |

OTHER PUBLICATIONS

Gao et al., "Synthesis and properties of transparent cycloaliphatic epoxy-silicone resins for opto-electronic devices packaging," Elsevier, Optical Materials, Dec. 2, 2012, pp. 567-575.

Kim et al., "High performance encapsulant for light-emitting diodes (LEDs) by sol-gel derived hydrogen siloxane hybrid," J. Mater. Chem, vol. 22, No. 7954, Feb. 15, 2012, pp. 7954-7960.

* cited by examiner

CURABLE COMPOSITION AND ELECTRONIC DEVICE EMPLOYING THE SAME

CROSS REFERENCE TO RELATED APPLICATIONS

The application is based on, and claims priority from, Taiwan Application Serial Number 110131442, filed on Aug. 25, 2021, the disclosure of which is hereby incorporated by reference herein in its entirety.

TECHNICAL FIELD

The disclosure relates to a curable composition and an electronic device employing the same.

BACKGROUND

With the development of sensing technology and internet technology, soft electronic devices have been gradually found wide application as wearable devices and for smart medical treatment, health care, in smart home systems, transportations and the internet of things. Taking the wearable device as an example, in order to improve comfort and mobility, soft electronic devices need to be curvable, rollable, bendable, foldable, flexible and stretchable.

Furthermore, the materials used to package and protect soft electronic devices also need to have flexibility, stretchability and recoverability, so as to fully protect the soft electronic devices and avoid reducing their reliability.

Conventional flexible packaging materials can be divided into two main groups: thermoplastic polyurethane (TPU) and polydimethylsiloxane (PDMS). However, thermoplastic polyurethane has the disadvantages of poor thermal tolerance and recoverability. Furthermore, the gas barrier property and adhesion of polydimethylsiloxane (PDMS) still need to be enhanced.

Therefore, a novel flexible packaging material suitable for packaging soft electronic components is called for to solve the aforementioned problems.

SUMMARY

The disclosure provides a curable composition. According to embodiments of the disclosure, the curable composition includes 100 parts by mole of the first siloxane compound, 1 to 15 parts by mole of the second siloxane compound, 1 to 15 parts by mole of the third siloxane compound, and 90 to 250 parts by mole of curing agent. The first siloxane compound has a structure represented by Formula (I)

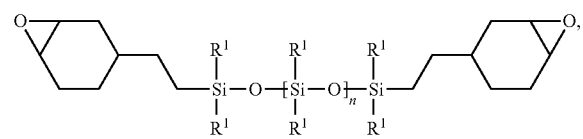

Formula (I)

wherein n is 8 to 232, and $R^1$ is independently $C_{1-3}$ alkyl group. The second siloxane compound has a structure represented by Formula (II)

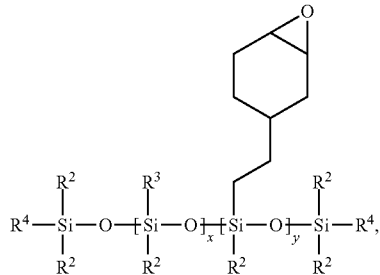

Formula (II)

wherein x≥2, y≥2, and x/y is between 0.1 and 3, wherein $R^2$, $R^3$ and $R^4$ are independently $C_{1-3}$ alkyl group. The third siloxane compound has a structure represented by Formula (III).

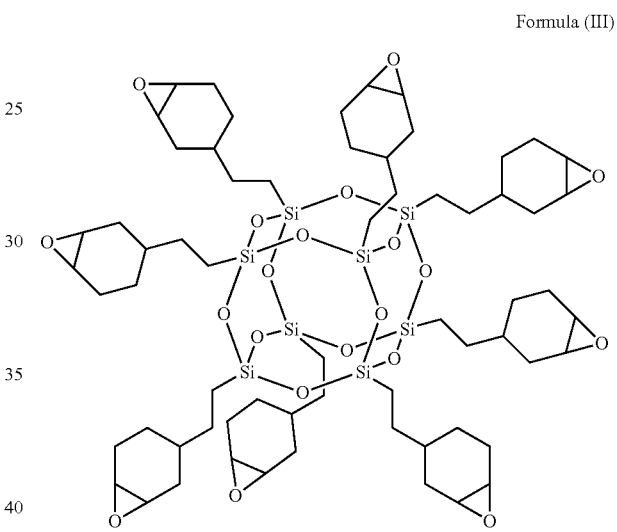

Formula (III)

The curing agent has a structure represented by Formula IV

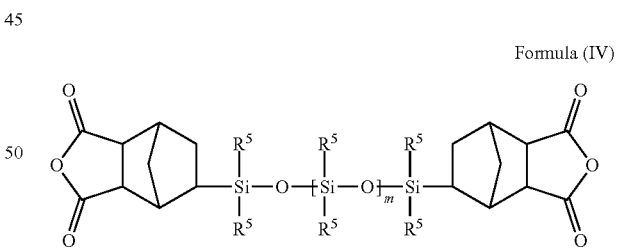

Formula (IV)

wherein m is 7 to 230, and $R^5$ is independently $C_{1-3}$ alkyl group.

According to embodiments of the disclosure, the disclosure also provides an electronic device. According to embodiments of the disclosure, the electronic device includes a substrate and a film. The film covers the substrate, wherein the film is prepared from the aforementioned curable composition.

A detailed description is given in the following embodiments.

BRIEF DESCRIPTION OF THE DRAWINGS

FIGURE shows a schematic view of the electronic device according to an embodiment of the disclosure.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are shown schematically in order to simplify the drawing.

The disclosure provides a curable composition, and an electronic device employing the same. According to embodiments of the disclosure, the curable composition of the disclosure includes a terminal siloxane epoxy resin with specific chain length (i.e. the first siloxane compound), a side-chain siloxane epoxy resin with specific functional group ratio (i.e. the second siloxane compound), and a cage siloxane epoxy resin (i.e. the third siloxane compound) as functional siloxane epoxy resins, and further includes a terminal siloxane anhydride with specific structure and chain length (serving as curing agent). As a result, with the specific components and specific molar ratio, the cured product of the curable composition of the disclosure can have good stretchability, recoverability, and interface adhesion on the premise of maintaining mechanical strength, visible light transmittance and thermal tolerance. In addition, the components of the curable composition of the disclosure have functional groups which can produce interaction with the flexible substrate. Therefore, the interface adhesion of the cured product of the curable composition can be further improved. Accordingly, the curable composition of the disclosure is suitable for serving as the packaging material of an electronic device (such as a soft electronic device).

According to embodiments of the disclosure, the curable composition includes 100 parts by mole of the first siloxane compound, 1 to 15 parts by mole of the second siloxane compound, 1 to 15 parts by mole of the third siloxane compound, and 90 to 250 parts by mole of curing agent.

According to embodiments of the disclosure, the first siloxane compound has a structure represented by Formula (I)

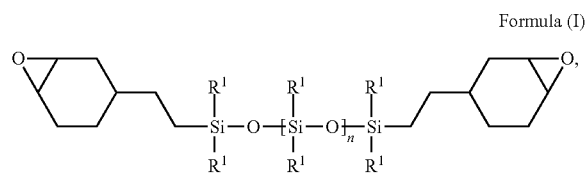

Formula (I)

wherein $R^1$ is independently $C_{1-3}$ alkyl group, n is an integer from 8 to 232. According to embodiments of the disclosure, $R^1$ can be independently methyl, ethyl, propyl, or an isomer thereof. According to embodiments of the disclosure, the first siloxane compound has a weight average molecular weight from 1,000 g/mol to 18,000 g/mol, such as 1,200 g/mol to 18,000 g/mol, 1,500 g/mol to 15,000 g/mol, or 2,000 g/mol to 13,000 g/mol. When the first siloxane compound has a weight average molecular weight from 1,000 g/mol to 18,000 g/mol, the cured product of the curable composition of the disclosure exhibits superior stretchability and recoverability.

According to embodiments of the disclosure, the second siloxane compound has a structure represented by Formula (II)

Formula (II)

wherein $x \geq 2$, $y \geq 2$, and x/y is between 0.1 and 3, wherein $R^2$, $R^3$ and $R^4$ are independently $C_{1-3}$ alkyl group. According to embodiments of the disclosure, $R^2$, $R^3$ and $R^4$ can be independently methyl, ethyl, propyl, or an isomer thereof. When x/y is less than about 0.1, the cured product would exhibit excessive cross-linking density and stress and insufficient toughness. When x/y is greater than about 3, the cured product exhibits inferior gas barrier property and poor adhesion due to the insufficient crosslinking density. According to embodiments of the disclosure, the second siloxane compound has a weight average molecular weight of about 1,800 g/mol to 4,000 g/mol, such as 2,000 g/mol to 4,000 g/mol, or 2,800 g/mol to 3,200 g/mol. When the second siloxane compound has a weight average molecular weight of about 1,800 g/mol to 4,000 g/mol, the cured product of the curable composition of the disclosure exhibits superior stretchability, and recoverability.

According to embodiments of the disclosure, the third siloxane compound can be a cage siloxane compound having a structure represented by Formula (III).

Formula (III)

According to embodiments of the disclosure, since the cage siloxane compound is a siloxane with stereoscopic structure and having eight reactive functional groups, the cage siloxane compound can be used to adjust the mechanical properties of the cured product, thereby improving the mechanical strength of the cured product.

According to embodiments of the disclosure, the curing agent is an anhydride curing agent with a structure represented by Formula (IV)

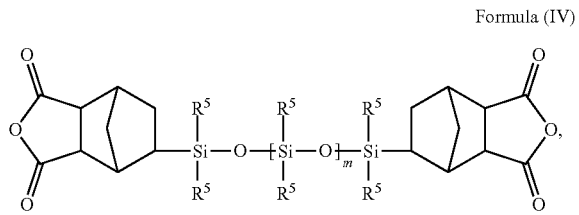

Formula (IV)

wherein m can be 7 to 230, and $R^5$ is independently $C_{1-3}$ alkyl group. According to embodiments of the disclosure, when the anhydride curing agent is the anhydride curing agent having a structure represented by Formula (IV), the cured product of the curable composition of the disclosure can exhibit superior mechanical strength, stretchability, and recoverability simultaneously. According to embodiments of the disclosure, $R^5$ can be independently methyl, ethyl, propyl, or an isomer thereof.

According to embodiments of the disclosure, the anhydride curing agent has a weight average molecular weight of 1,000 g/mol to 18,000 g/mol, such as 1,300 g/mol to 18,000 g/mol, 1,500 g/mol to 15,000 g/mol, or 2,000 g/mol to 13,000 g/mol. According to embodiments of the disclosure, when the anhydride curing agent has a weight average molecular weight from 1,000 g/mol to 18.000 g/mol, the cured product of the curable composition of the disclosure exhibits superior stretchability, and recoverability.

According to embodiments of the disclosure, the first siloxane compound (i.e. terminal siloxane epoxy resin) in the curable composition serves as a functional resin for reducing the stress of the composition. The amount of the first siloxane compound is about 100 parts by mole. In some embodiments of the disclosure, the second siloxane compound (i.e. side-chain siloxane epoxy resin) and the third siloxane compound (cage siloxane epoxy resin having eight reactive functional groups) can enhance the cross-linking density of the curable composition, thereby forcing that the cured product of the curable composition (i.e. packaging material) exhibits relatively high cross-linking degree and a network structure. As a result, the stretchability, recoverability, and interface adhesion of the cured product can be improved. According to some embodiments of the disclosure, the amount of the second siloxane compound is about 1-15 parts by mole (such as about 1, 2, 3, 4, 5, 6, 7, 8, 9, 10, 11, 12, 13, 14, or 15 parts by mole), and the amount of the third siloxane compound is about 1-15 parts by mole (such as about 1, 2, 3, 4, 5, 6, 7, 8, 9, 10, 11, 12, 13, 14, or 15 parts by mole). When the amount of the second siloxane compound and the third siloxane compound in the curable composition is too low, the cured product of the curable composition (i.e. packaging material) exhibits poor interface adhesion due to the inappropriate cross-linking density. Conversely, when the amount of the second siloxane compound and the third siloxane compound in the curable composition is too high, the cured product of the curable composition exhibits reduced stretchability and recoverability due to the excessive cross-linking density.

In addition, since the composition of the disclosure employs terminal siloxane anhydride with specific chemical structure as curing agent (i.e. anhydride curing agent having a structure represented by Formula (IV)) which is used in concert with the first siloxane compound, the second siloxane compound, and the third siloxane compound, the cured product of the curable composition can have good stretchability, recoverability, and interface adhesion on the premise of maintaining mechanical strength, visible light transmittance (greater than 90%) and thermal tolerance.

In addition, it should be noted that, when the terminal siloxane anhydride of the disclosure is replaced with conventional anhydride curing agent, aliphatic amine curing agent, cyclic aliphatic amine curing agent, aromatic-aliphatic amine, or phenolic curing agent, the cured product of the curable composition would exhibit inferior stretchability, recoverability and interface adhesion. The conventional anhydride curing agent can be methyl hexahydrophthalic anhydride, methyltetrahydrophthalic anhydride, maleic anhydride (MAH), or polystyrene-co-maleic anhydride (SMA). For example, aliphatic amine curing agent can be JEFFAMINE® D-230 (polyetheramine); cyclic aliphatic amine curing agent can be cyclohexanediamine; aromatic-aliphatic amine can be oxydianiline, or stearyl amine ethoxylate (SAA); phenolic curing agent can be phenol-formaldehyde novolac (HRJ series), or melamine phenol novolac.

According to embodiments of the disclosure, the composition of the disclosure can include terminal siloxane anhydride having a structure represented by Formula (IV). The amount of terminal siloxane anhydride can be about 90 to 250 parts by mole, such as about 100 parts by mole, 110 parts by mole, 120 parts by mole, 130 parts by mole, 140 parts by mole, 150 parts by mole, 160 parts by mole, 170 parts by mole, 180 parts by mole, 190 parts by mole, 200 parts by mole, or 210 parts by mole. According to embodiments of the disclosure, the composition does not include anhydride compound except the terminal siloxane anhydride having a structure represented by Formula (IV), in order to avoid reducing the stretchability, recoverability and interface adhesion of the cured product of the curable composition. In the embodiments of the disclosure, in order to accelerate the rate of cross-linking reaction, the curable composition can further include a reaction accelerator. The amount of reaction accelerator is about 0.1 wt % to 1 wt %, based on the total weight of the first siloxane compound, the second siloxane compound, and the third siloxane compound. According to embodiments of the disclosure, the reaction accelerator can be quaternary phosphate, amine, or a combination thereof. According to embodiments of the disclosure, the reaction accelerator can be 1,8-diazabicyclo [5.4.0] undecano-7-ene (DBU) or its salts (such as phenol salt, octanoate, p-toluene sulfonate, formate, tetraphenylgroup boronate, etc.), 1,5-diazabicyclo [4.3.0] non-5-ene (DBN) or its salts (such as phenol salt, octanoate, p-toluene sulfonate, formate, tetraphenylgroup boronate, etc.), benzyldimethylamine, 2,4,6-tris (dimethylaminomethyl) phenol, or N, N-dimethylcyclohexylamine tetraphenylphosphonium tetraborate. For example, the reaction accelerator can be commercially available products with the following trade number: U-CAT SA 506, U-CAT SA 102, U-CAT 5003, U-CAT 18X, U-CAT 12XD (sold by San APRO), TPP-K, TPP-MK (sold by Beixing chemical industry), or PX-4ET (sold by Japan Chemical Industry).

According to embodiments of the disclosure, the curable composition of the disclosure can further include an additive, in order to improve the physicochemical properties of the cured product of the curable composition. According to embodiments of the disclosure, the additive has a weight percentage of 0.1 wt % to 5 wt %, based on the total weight of the first siloxane compound, the second siloxane compound, and the third siloxane compound. According to embodiments of the disclosure, the additive can include adhesion promoter, antioxidant, defoamer, levelling agent, stabilizer, or a combination thereof. According to embodiments of the disclosure, the additive can consist of an adhesion promoter, antioxidant, defoamer, levelling agent, or stabilizer. According to embodiments of the disclosure, the adhesion promoter can be a compound which enhances the adhesion between the cured product and the coated surface of an article. For example, the adhesion promoter can be octyltriethoxysilane, mercaptopropyltriethoxysilane, cyanopropyltrimethoxysilane, 2-(3,4epoxycyclohexyl)methyltrimethoxysilane, 2-(3,4epoxycyclohexyl)ethyltrimethoxysilane, 3-(trimethoxysilyl)propyl methacrylate, 3-(trimethoxysilyl)propyl acrylate, 3-glycidoxypropyltrimethoxysilane, 3-glycidoxypropyltriethoxysilane, 3-methacryloxypropyltrimethoxysilane, or 3-acryloxypropyltrimethoxysilane. According to embodiments of the disclosure, the antioxidant can be hindered phenol antioxidant, thioester antioxidant, phosphite antioxidant, or a combination thereof. For example, the antioxidant can be 2,6-di-tert-butyl-4-methylphenol, 2,5-di-tert-amylhydroquinone, 2,5-di-tert-butylhydroquinone, 4,4'-butylidene-bis(3-methyl-6-tert-butylphenol), 2,2'-methylene-bis(4-methyl-6-tert-butylphenol), 2,2'-methylene-bis(4-ethyl-6-tert-butylphenol), 4,4'-thiobis(2-t-butyl-5-methylphenol), 2,2'-thio diethyl bis-[3-(3,5-di-t-butyl-4-hydroxyphenyl)-propionate], pentaerythrityl-tetrakis-[3-(3,5-di-t-butyl-4-hydroxyphenyl)-propionate], 4,4'-thiobis(2-methyl-6-t-butylphenol), 2,2'-thiobis (6-t-butyl-4-methylphenol), octadecyl-[3-(3,5-di-t-butyl-4-hydroxyphenyl)-propionate], triethyleneglycol-bis-[3-(3-t-butyl-4-hydroxy-5-methylphenol)propionate], thiodiethylene bis[3-(3,5-di-t-butyl-4-hydroxyphenyl)propionate], 6,6'-di-t-butyl-2,2'-thiodi-p-cresol, dioctadecyl 3,3'-thiodipropionate, trisnonylphenol phosphite, triphenyl phosphite, diphenyl phosphite, phenyl diisodecyl phosphite, diphenyl isodecyl phosphite, diphenyl isooctyl phosphite, tetraphenyl dipropyleneglycol diphosphite, or a combination thereof.

According to an embodiment of the disclosure, in order to achieve elimination of volatiles or small molecule compounds during the packaging process and maintain the yield and reliability of the products, the curable composition of the disclosure does not include any solvents (such as organic solvents or water).

According to embodiments of the disclosure, the curable composition can consist of the first siloxane compound, the second siloxane compound, the third siloxane compound, and curing agent. According to embodiments of the disclosure, the curable composition can consist of the first siloxane compound, the second siloxane compound, the third siloxane compound, curing agent, and solvent. According to embodiments of the disclosure, the curable composition can consist of the first siloxane compound, the second siloxane compound, the third siloxane compound, curing agent, and reaction accelerator. According to embodiments of the disclosure, the curable composition can consist of the first siloxane compound, the second siloxane compound, the third siloxane compound, curing agent, reaction accelerator, and solvent. According to embodiments of the disclosure, the curable composition can consist of the first siloxane compound, the second siloxane compound, the third siloxane compound, curing agent, reaction accelerator, and additive. According to embodiments of the disclosure, the curable composition can consist of the first siloxane compound, the second siloxane compound, the third siloxane compound, curing agent, reaction accelerator, additive, and solvent.

According to embodiments of the disclosure, the curable composition of the disclosure can consist of a main ingredient and a minor ingredient, wherein the main ingredient consists of the first siloxane compound, the second siloxane compound, the third siloxane compound, and curing agent, and the minor ingredient can consist of reaction accelerator, solvent, and additive. According to embodiments of the disclosure, the curable composition of the disclosure can substantially consist of the first siloxane compound, the second siloxane compound, the third siloxane compound, and curing agent, wherein the other component can be reaction accelerator, solvent or additive. According to embodiments of the disclosure, the curable composition of the disclosure can substantially consist of first siloxane compound, the second siloxane compound, the third siloxane compound, curing agent, and reaction accelerator, and the other components can be a solvent or an additive. According to embodiments of the disclosure, the curable composition of the disclosure can substantially consist of the first siloxane compound, the second siloxane compound, the third siloxane compound, curing agent, reaction accelerator, and solvent, and the other components can be additive. According to embodiments of the disclosure, the curable composition of the disclosure can be further coated on a substrate to be subjected to a curing process, thereby obtaining an electronic device. According to embodiments of the disclosure, the substrate can be a flexible substrate, and any required electronic component (such as electrode, control element, detection element, or display element) can be formed on the flexible substrate. The accompanying drawings illustrate the substrate as a plain rectangle in order to simplify the illustration. According to embodiments of the disclosure, the flexible substrate can be polyimide, polycarbonate, polyethersulfone, polyacrylate, polynorbonene, polyethylene terephthalate, polyetheretherketone, polyethylene naphthalate, polyetherimide or combination thereof. As shown in FIGURE, the electronic device 100 includes a substrate 10 and a film 20, wherein the film 20 is formed on the substrate 10. According to embodiments of the disclosure, the curable composition of the disclosure is formed on the substrate 10 by a coating process to form a coating. Next, the coating is subjected to a curing process, to form a film 20. According to embodiments of the disclosure, the coating process can be screen printing, spin coating, bar coating, blade coating, roller coating, dip coating, spray coating, or brush coating. According to embodiments of the disclosure, the temperature of the curing process is about 80° C. to 180° C., and the period of the curing process is about 30 minutes to several hours (such as 1 hour, 2 hours, 3 hours, 4 hours, 5 hours, 6 hours, 7 hours, or 8 hours). In addition, before curing the coating, the coating can be subjected to baking process to remove the solvent of the curable composition. According to embodiments of the disclosure, in general, the film 20 has a thickness of about 0.1 μm to 5 mm, but the disclosure is not limited thereto. The cured product of the curable composition of the disclosure (i.e. film 20) can serve as packaging material and can be applied in packaging of soft electronic devices due to improved stretchability, recoverability and interface adhesion. As a result, the curable composition of the disclosure can serve as packaging material to fully protect soft electronic device and improve the reliability of soft electronic devices.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Table 1 lists the terminal siloxane epoxy resin, side-chain siloxane epoxy resin, cage siloxane epoxy resin, and terminal siloxane anhydride used in Examples and Comparative Examples of the disclosure.

TABLE 1

| | structure | weight average molecular weight (Mw) |
|---|---|---|
| terminal siloxane epoxy resin (1) | 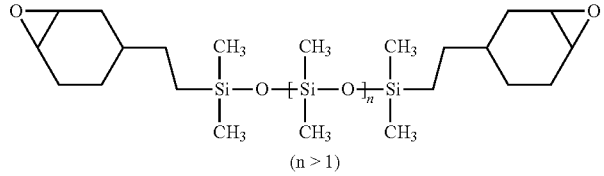 (n > 1) | ~1200 |
| terminal siloxane epoxy resin (2) | | ~17500 |
| terminal siloxane epoxy resin (3) | | ~900 |
| terminal siloxane epoxy resin (4) | | ~28300 |
| side-chain siloxane epoxy resin (1) | 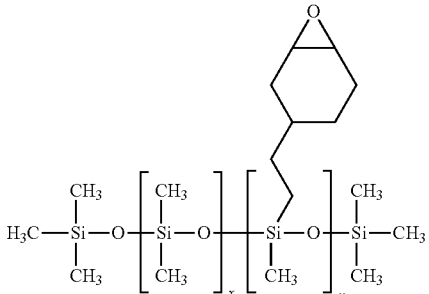 (x is greater than equal to 2, y is greater than equal to 2, and x/y = 2.8~3.0) | ~3000 |
| cage siloxane epoxy resin (EP0408, commercially available from Hybrid Plastics) | 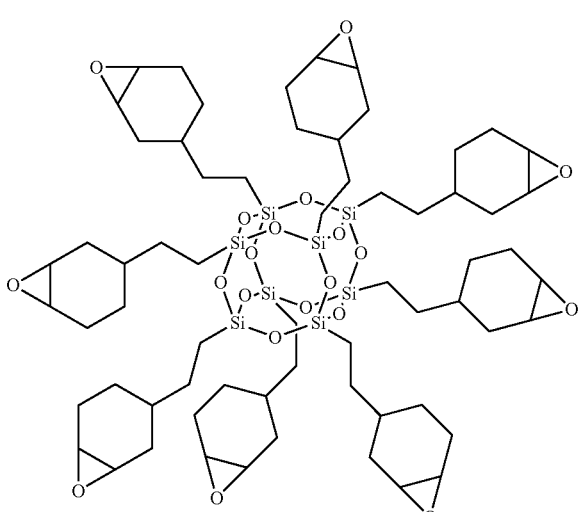 | 1418.2 |

TABLE 1-continued

| structure | weight average molecular weight (Mw) |
|---|---|
| terminal siloxane anhydride (1) 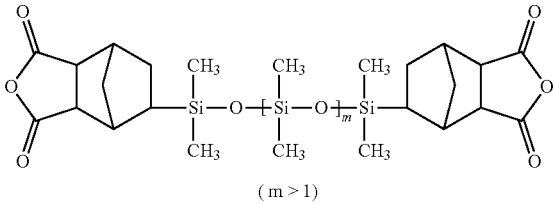 [SMILES: C[Si](C)(O[Si](C)(C)C1CC2CC1C1C(=O)OC(=O)C21)O[Si](C)(C)C1CC2CC1C1C(=O)OC(=O)C21] (m > 1) | ~1300 |
| terminal siloxane anhydride (2) | ~17600 |

EXAMPLES

Terminal Siloxane Epoxy Resin

Preparation Example 1

38.75 µg of 4-vinyl-1-cyclohexene-1,2-epoxide, 0.03 µg of tris(dibutylsulfide) rhodium trichloride, and 300 ml of toluene were added into a reaction bottle, and the reaction bottle was heated to 100° C. Next, 131.25 g of DMS-H11 (hydrogen-containing polysiloxane compound, sold by Gelest, Inc.) was added slowly into the reaction bottle at 100° C. After the addition of DMS-H11 was complete, the reaction bottle was heated to 115° C. and then stirred continuously. FT-IR analysis indicated the reaction was complete, as judged by the absence of a SiH band (2160 $cm^{-1}$) in the FT-IR spectrum. After the reaction was complete, the reaction bottle was cooled to room temperature. Next, charcoal was added into the reaction bottle and the result was stirred and then purified. Finally, after removing the charcoal by filtration and removing the toluene by rotary evaporation, Terminal siloxane epoxy resin (1) (with an average epoxide equivalent weight (EEW) of 649 g/eq) was obtained. Next, the measurement results of nuclear magnetic resonance spectrometry of Terminal siloxane epoxy resin (1) are shown below: 1H-NMR ($CDCl_3$, 500 MHz) 0.04 ppm (s, $CH_3$—Si), 0.48 ppm (m, —$CH_2$—Si), 0.17~2.18 ppm (m, cyclohexyl group), 3.12 ppm (m, epoxy group).

Preparation Example 2

3.9 µg of 4-vinyl-1-cyclohexene-1,2-epoxide, 0.05 µg of tris(dibutylsulfide)rhodium trichloride, and 300 ml of toluene were added into a reaction bottle, and the reaction bottle was heated to 100° C. Next, 215 g of DMS-H25 (hydrogen-containing polysiloxane compound, sold by Gelest, Inc.) was added slowly into the reaction bottle at 100° C. After the addition of DMS-H25 was complete, the reaction bottle was heated to 115° C. and then stirred continuously. FT-IR analysis indicated the reaction was complete, as judged by the absence of a SiH band (2160 $cm^{-1}$) in the FT-IR spectrum. After the reaction was complete, the reaction bottle was cooled to room temperature. Next, charcoal was added into the reaction bottle and the result was stirred and then purified. Finally, after removing the charcoal by filtration and removing the toluene by rotary evaporation, Terminal siloxane epoxy resin (2) (with an average epoxide equivalent weight (EEW) of 8724 g/eq) was obtained. Next, the measurement results of nuclear magnetic resonance spectrometry of Terminal siloxane epoxy resin (2) are shown below: $^1$H-NMR ($CDCl_3$, 500 MHz) 0.04 ppm (s, $CH_3$—Si), 0.48 ppm (m, —$CH_2$—Si), 0.17-2.18 ppm (m, cyclohexyl group), 3.12 ppm (m, epoxy group).

Preparation Example 3

62.1 µg of 4-vinyl-1-cyclohexene-1,2-epoxide, 0.03 µg of tris(dibutylsulfide)rhodium trichloride, and 320 ml of toluene were added into a reaction bottle, and the reaction bottle was heated to 100° C. Next, 215 g of DMS-H03 (hydrogen-containing polysiloxane compound, sold by Gelest, Inc.) was added slowly into the reaction bottle at 100° C. After the addition of DMS-H03 was complete, the reaction bottle was heated to 115° C. and then stirred continuously. FT-IR analysis indicated the reaction was complete, as judged by the absence of a SiH band (2160 $cm^{-1}$) in the FT-IR spectrum. After the reaction was complete, the reaction bottle was cooled to room temperature. Next, charcoal was added into the reaction bottle and the result was stirred and then purified. Finally, after removing the charcoal by filtration and removing the toluene by rotary evaporation, Terminal siloxane epoxy resin (3) (with an average epoxide equivalent weight (EEW) of 475 g/eq) was obtained. Next, the measurement results of nuclear magnetic resonance spectrometry of Terminal siloxane epoxy resin (3) are shown below: $^1$H-NMR ($CDCl_3$, 500 MHz) 0.04 ppm (s, $CH_3$—Si), 0.48 ppm (m. —$CH_2$—Si), 0.17-2.18 ppm (m, cyclohexyl group), 3.12 ppm (m, epoxy group).

Preparation Example 4

2.48 µg of 4-vinyl-1-cyclohexene-1,2-epoxide, 0.05 µg of tris(dibutylsulfide)rhodium trichloride, and 230 ml of toluene were added into a reaction bottle, and the reaction bottle was heated to 100° C. Next, 100 g of DMS-H31 (hydrogen-containing polysiloxane compound, sold by Gelest, Inc.) was added slowly into the reaction bottle at 100° C. After the addition of DMS-H31 was complete, the reaction bottle was heated to 115° C. and then stirred continuously. FT-IR analysis indicated the reaction was complete, as judged by the absence of a SiH band (2160 $cm^{-1}$) in the FT-IR spectrum. After the reaction was complete, the reaction bottle was cooled to room temperature. Next, charcoal was added into the reaction bottle and the result was stirred and then purified. Finally, after removing the charcoal by filtration and removing the toluene by rotary evaporation, Terminal siloxane epoxy resin (4) (with an average epoxide equivalent weight (EEW) of 14150 g/eq) was obtained.

Next, the measurement results of nuclear magnetic resonance spectrometry of Terminal siloxane epoxy resin (4) are shown below: $^1$H-NMR (CDCl$_3$, 500 MHz) 0.04 ppm (s. CH$_3$—Si), 0.48 ppm (m, —CH—Si), 0.17-2.18 ppm (m, cyclohexyl group), 3.12 ppm (m, epoxy group).

Preparation of Terminal Siloxane Anhydride

Preparation Example 5

15.6 g of nadic anhydride and 130 ml toluene (toluene) were added into a reaction bottle, and the reaction bottle was heated to 120° C. and then stirred completely, obtaining a nadic anhydride solution. Next, 0.5 ml of platinum catalyst (divinyltetramethyldisiloxane complex) was dissolved in xylene and then the result was added into the nadic anhydride solution at 70° C. Next, the obtained solution was stirred completely at 70° C. for 20 minutes, and 50 g of DMS-H11 (hydrogen-containing polysiloxane compound, sold by Gelest, Inc.) (with a molecular weight of about 1000-1100 g/mol) was added into the solution over 2 hours. After the addition was complete, the obtain solution was reacted at 70° C. for 24 hours. After the reaction was complete, the reaction bottle was cooled to room temperature, and then the result was purified, obtaining Terminal siloxane anhydride (1). The measurement results of nuclear magnetic resonance spectrometry of Terminal siloxane anhydride (1) are shown below: $^1$H-NMR (CDCl$_3$, 500 MHz) 0.03-0.05 ppm (s, CH$_3$—Si—), 0.65 ppm (s, —CH—Si—), 1.55~1.66 ppm (m, cyclopentyl group), 3.39 ppm (—C=O).

Preparation Example 6

15.6 g of nadic anhydride and 130 ml toluene (toluene) were added into a reaction bottle, and the reaction bottle was heated to 120° C. and then stirred completely, obtaining a nadic anhydride solution. Next, 0.5 ml of platinum catalyst (divinyltetramethyldisiloxane complex) was dissolved in xylene and then the result was added into the nadic anhydride solution at 70° C. Next, the obtained solution was stirred completely at 70° C. for 20 minutes, and 81.8 g of DMS-H25 (hydrogen-containing polysiloxane compound, sold by Gelest, Inc.) (with a molecular weight of about 17200 g/mol) was added into the solution over 2 hours. After the addition was complete, the obtain solution was reacted at 70° C. for 24 hours. After the reaction was complete, the reaction bottle was cooled to room temperature, and then the result was purified, obtaining Terminal siloxane anhydride (2). The measurement results of nuclear magnetic resonance spectrometry of Terminal siloxane anhydride (2) are shown below: 0.03-0.05 ppm (s, CH$_3$—Si—), 0.65 ppm (s, —CH—Si—), 1.55-1.66 ppm (m, cyclopentyl group), 3.39 ppm (—C=O).

Curable Composition

Example 1

First, 122.85 parts by mole of Terminal siloxane anhydride (1) (serving as hardener) and 0.435 parts by weight of a reaction accelerator (with a trade number of U-Cat 18X, sold by San-Apro) (the total weight of Terminal siloxane epoxy resin (1), Side-chain siloxane epoxy resin (1), and Cage siloxane epoxy resin was 100 parts by weight) were mixed by planetary mixer at a speed of 2000 rpm for 5 minutes. After defoaming at a speed of 2200 rpm for 5 minutes, a mixture was obtained. Next, 100 parts by mole of Terminal siloxane epoxy resin (1), 4.5 parts by mole of side-chain siloxane epoxy resin (1), 2.1 parts by mole of cage siloxane epoxy resin were added into the planetary mixer and mixed with the mixture at a speed of 2000 rpm for 10 minutes. Next, the result was defoamed at a speed of 2200 rpm for 10 minutes, obtaining Curable composition (1). The components and amounts of Curable composition (1) were shown in Table 2.

Examples 2-4

Examples 2-4 were performed in the same manner as in Example 1 except that the amounts of Terminal siloxane anhydride (1), U-Cat 18X, Terminal siloxane epoxy resin (1), Side-chain siloxane epoxy resin (1), and Cage siloxane epoxy resin were allocated according to Table 2, obtaining Curable Compositions (2)-(4). The components and amounts of Curable compositions (2)-(4) were shown in Table 2.

Comparative Example 1

First, 486.3 parts by mole of Terminal siloxane anhydride (1) (serving as hardener) and 0.571 parts by weight of a reaction accelerator (with a trade number of U-Cat 18X, sold by San-Apro) (the total weight of Terminal siloxane epoxy resin (1), Side-chain siloxane epoxy resin (1), and Cage siloxane epoxy resin was 100 parts by weight) were mixed by planetary mixer at a speed of 2000 rpm for 5 minutes. After defoaming at a speed of 2200 rpm for 5 minutes, a mixture was obtained. Next, 100 parts by mole of Terminal siloxane epoxy resin (1), 59.5 parts by mole of side-chain siloxane epoxy resin (1), 34.4 parts by mole of cage siloxane epoxy resin were added into the planetary mixer and mixed with the mixture at a speed of 2000 rpm for 10 minutes. Next, the result was defoamed at a speed of 2200 rpm for 10 minutes, obtaining Composition (1). The components and amounts of Composition (1) were shown in Table 2.

Comparative Example 2

First, 98.85 parts by mole of Terminal siloxane anhydride (1) (serving as hardener) and 0.413 parts by weight of a reaction accelerator (with a trade number of U-Cat 18X, sold by San-Apro) (the weight of Terminal siloxane epoxy resin (1) was 100 parts by weight) were mixed by planetary mixer at a speed of 2000 rpm for 5 minutes. After defoaming at a speed of 2200 rpm for 5 minutes, a mixture was obtained. Next, 100 parts by mole of Terminal siloxane epoxy resin (1) were added into the planetary mixer and mixed with the mixture at a speed of 2000 rpm for 10 minutes. Next, the result was defoamed at a speed of 2200 rpm for 10 minutes, obtaining Composition (2). The components and amounts of Composition (2) were shown in Table 2.

TABLE 2

| | Example 1 | Example 2 | Example 3 | Example 4 | Comparative Example 1 | Comparative Example 2 |
|---|---|---|---|---|---|---|
| U-Cat 18X | 0.435 parts by weight | 0.44 parts by weight | 0.476 parts by weight | 0.494 parts by weight | 0.571 parts by weight | 0.413 parts by weight |
| Terminal siloxane anhydride (1) | 122.85 parts by mole | 122.48 parts by mole | 164.67 parts by mole | 196.2 parts by mole | 486.3 parts by mole | 98.85 parts by mole |
| Terminal siloxane epoxy resin (1) | 100 parts by mole | 100 parts by mole | 100 parts by mole | 100 parts by mole | 100 parts by mole | 100 parts by mole |
| Side-chain siloxane epoxy resin (1) | 4.5 parts by mole | 2.93 parts by mole | 8.43 parts by mole | 14.1 parts by mole | 59.55 parts by mole | — |
| Cage siloxane epoxy resin | 2.1 parts by mole | 3.1 parts by mole | 7.8 parts by mole | 9.4 parts by mole | 34.4 parts by mole | — |

Example 5

First, 124.5 parts by mole of Terminal siloxane anhydride (2) (serving as hardener) and 0.448 parts by weight of a reaction accelerator (with a trade number of U-Cat 18X, sold by San-Apro) (the total weight of Terminal siloxane epoxy resin (2). Side-chain siloxane epoxy resin (1), Cage siloxane epoxy resin was 100 parts by weight) were mixed by planetary mixer at a speed of 2000 rpm for 5 minutes. After defoaming at a speed of 2200) rpm for 5 minutes, a mixture was obtained. Next, 100 parts by mole of Terminal siloxane epoxy resin (2), 5.47 parts by mole of side-chain siloxane epoxy resin (1), 2.8 parts by mole of cage siloxane epoxy resin were added into the planetary-mixer and mixed with the mixture at a speed of 2000 rpm for 10 minutes. Next, the result was defoamed at a speed of 2200 rpm for 10 minutes, obtaining curable composition (5). The components and amounts of Curable composition (5) were shown in Table 2.

Examples 6-8

Examples 6-8 were performed in the same manner as in Example 5 except that the amounts of Terminal siloxane anhydride (2), U-Cat 18X, Terminal siloxane epoxy resin (2), Side-chain siloxane epoxy resin (1), and Cage siloxane epoxy resin were allocated according to Table 2, obtaining Curable Compositions (6)-(8). The components and amounts of Curable compositions (6)-(8) were shown in Table 2.

Comparative Example 3

First, 100 parts by mole of Terminal siloxane anhydride (2) (serving as hardener) and 0.604 parts by weight of a reaction accelerator (with a trade number of U-Cat 18X, sold by San-Apro) (the weight of Terminal siloxane epoxy resin (2) was 100 parts by weight) were mixed by planetary mixer at a speed of 2000 rpm for 5 minutes. After defoaming at a speed of 2200 rpm for 5 minutes, a mixture was obtained. Next, 100 parts by mole of Terminal siloxane epoxy resin (2) were added into the planetary mixer and mixed with the mixture at a speed of 2000 rpm for 10 minutes. Next, the result was defoamed at a speed of 2200 rpm for 10 minutes, obtaining Composition (3). The components and amounts of Composition (3) were shown in Table 3.

TABLE 3

| | Example 5 | Example 6 | Example 7 | Example 8 | Comparative Example 3 |
|---|---|---|---|---|---|
| U-Cat 18X | 0.448 parts by weight | 0.451 parts by weight | 0.529 parts by weight | 0.592 parts by weight | 0.604 parts by weight |
| Terminal siloxane anhydride (2) | 124.46 parts by mole | 125.42 parts by mole | 166.62 parts by mole | 200.69 parts by mole | 100 parts by mole |
| Terminal siloxane epoxy resin (2) | 100 parts by mole | 100 parts by mole | 100 parts by mole | 100 parts by mole | 100 parts by mole |
| Side-chain siloxane epoxy resin (1) | 5.47 parts by mole | 2.74 parts by mole | 8.16 parts by mole | 14.76 parts by mole | — |
| Cage siloxane epoxy resin | 2.8 parts by mole | 2.81 parts by mole | 10.01 parts by mole | 11.32 parts by mole | — |

Comparative Example 4

First, 199.51 parts by mole of methyl hexahydrophthalic anhydride (MHHPA) (serving as hardener) and 0.552 parts by weight (Herein, terminal siloxane epoxy resin (3) was 100 parts by weight) of a reaction accelerator (with a trade number of U-Cat 18X, sold by San-Apro) were mixed by planetary mixer at a speed of 2000 rpm for 5 minutes. After defoaming at a speed of 2200 rpm for 5 minutes, a mixture was obtained. Next, 100 parts by mole of Terminal siloxane epoxy resin (3) were added into the planetary mixer and mixed with the mixture at a speed of 2000 rpm for 10 minutes. Next, the result was defoamed at a speed of 2200 rpm for 10 minutes, obtaining Composition (4). The components and amounts of Composition (4) were shown in Table 4.

Comparative Example 5

First, 205.22 parts by mole of methyl hexahydrophthalic anhydride (MHHPA) (serving as hardener) and 0.305 parts by weight of a reaction accelerator (with a trade number of U-Cat 18X, sold by San-Apro) (the weight of Terminal siloxane epoxy resin (4) was 100 parts by weight) were mixed by planetary mixer at a speed of 2000 rpm for 5 minutes. After defoaming at a speed of 2200 rpm for 5 minutes, a mixture was obtained. Next, 100 parts by mole of Terminal siloxane epoxy resin (4) were added into the planetary mixer and mixed with the mixture at a speed of 2000 rpm for 10 minutes. Next, the result was defoamed at a speed of 2200 rpm for 10 minutes, obtaining Composition (5). The components and amounts of Composition (5) were shown in Table 4.

Comparative Example 6

First, 105.3 parts by mole of Terminal siloxane anhydride (1) (serving as hardener) and 0.316 parts by weight of a reaction accelerator (with a trade number of U-Cat 18X, sold by San-Apro) (the total weight of Terminal siloxane epoxy resin (4) was 100 parts by weight) were mixed by planetary mixer at a speed of 2000 rpm for 5 minutes. After defoaming at a speed of 2200 rpm for 5 minutes, a mixture was obtained. Next, 100 parts by mole of Terminal siloxane epoxy resin (4) were added into the planetary mixer and mixed with the mixture at a speed of 2000 rpm for 10 minutes. Next, the result was defoamed at a speed of 2200 rpm for 10 minutes, obtaining Composition (6). The components and amounts of Composition (6) were shown in Table 4.

Comparative Example 7

First, 99.55 parts by mole of Terminal siloxane anhydride (2) (serving as hardener) and 0.162 parts by weight of a reaction accelerator (with a trade number of U-Cat 18X, sold by San-Apro) (the weight of Terminal siloxane epoxy resin (4) was 100 parts by weight) were mixed by planetary mixer at a speed of 2000 rpm for 5 minutes. After defoaming at a speed of 2200 rpm for 5 minutes, a mixture was obtained. Next, 100 parts by mole of Terminal siloxane epoxy resin (4) were added into the planetary mixer and mixed with the mixture at a speed of 2000 rpm for 10 minutes. Next, the result was defoamed at a speed of 2200 rpm for 10 minutes, obtaining Composition (7). The components and amounts of Composition (7) were shown in Table 4.

Comparative Example 8

First, 195.77 parts by mole of Terminal siloxane anhydride (1) (serving as hardener) and 0.482 parts by weight of a reaction accelerator (with a trade number of U-Cat 18X, sold by San-Apro) (the total weight of Terminal siloxane epoxy resin (1), Side-chain siloxane epoxy resin (1), Cage siloxane epoxy resin was 100 parts by weight) were mixed by planetary mixer at a speed of 2000 rpm for 5 minutes. After defoaming at a speed of 2200 rpm for 5 minutes, a mixture was obtained. Next, 100 parts by mole of Terminal siloxane epoxy resin (1), 19.25 parts by mole of side-chain siloxane epoxy resin (1), 4.65 parts by mole of cage siloxane epoxy resin were added into the planetary mixer and mixed with the mixture at a speed of 2000 rpm for 10 minutes. Next, the result was defoamed at a speed of 2200 rpm for 10 minutes, obtaining Composition (8). The components and amounts of Composition (8) were shown in Table 4.

Comparative Example 9

First, 195.8 parts by mole of Terminal siloxane anhydride (1) (serving as hardener) and 0.52 parts by weight of a reaction accelerator (with a trade number of U-Cat 18X, sold by San-Apro) (the total weight of Terminal siloxane epoxy resin (1). Side-chain siloxane epoxy resin (1), Cage siloxane epoxy resin was 100 parts by weight) were mixed by planetary mixer at a speed of 2000 rpm for 5 minutes. After defoaming at a speed of 2200 rpm for 5 minutes, a mixture was obtained. Next, 100 parts by mole of Terminal siloxane epoxy resin (1), 4.87 parts by mole of side-chain siloxane epoxy resin (1), 18.15 parts by mole of cage siloxane epoxy resin were added into the planetary mixer and mixed with the mixture at a speed of 2000 rpm for 10 minutes. Next, the result was defoamed at a speed of 2200 rpm for 10 minutes, obtaining Composition (9). The components and amounts of Composition (9) were shown in Table 4.

TABLE 4

|  | Comparative Example 4 | Comparative Example 5 | Comparative Example 6 | Comparative Example 7 | Comparative Example 8 | Comparative Example 9 |
| --- | --- | --- | --- | --- | --- | --- |
| U-Cat 18X | 0.552 parts by weight | 0.451 parts by weight | 0.316 parts by weight | 0.162 parts by weight | 0.482 parts by weight | 0.52 parts by weight |
| MHHPA | 199.51 parts by mole | 205.22 parts by mole | — | — | — | — |
| Terminal siloxane anhydride (1) | — | — | 105.3 parts by mole | — | 195.77 parts by mole | 195.8 parts by mole |
| Terminal siloxane anhydride (2) | — | — | — | 99.55 parts by mole | — | — |
| Terminal siloxane epoxy resin (1) | — | — | — | — | 100 parts by mole | — |
| Terminal siloxane epoxy resin (3) | 100 parts by mole | — | — | — | — | — |
| Terminal siloxane epoxy resin (4) | — | 100 parts by mole | 100 parts by mole | 100 parts by mole | — | — |
| Side-chain siloxane epoxy resin (1) | — | — | — | — | 19.25 parts by mole | 4.87 parts by mole |
| Cage siloxane epoxy resin | — | — | — | — | 4.65 parts by mole | 18.15 parts by mole |

Comparative Example 10

First, 163.3 parts by mole of Terminal siloxane anhydride (1) (serving as hardener) and 0.5 parts by weight of a reaction accelerator (with a trade number of U-Cat 18X, sold by San-Apro) (the total weight of Terminal siloxane epoxy resin (1) and Cage siloxane epoxy resin was 100 parts by weight) were mixed by planetary mixer at a speed of 2000 rpm for 5 minutes. After defoaming at a speed of 2200 rpm for 5 minutes, a mixture was obtained. Next, 100 parts by mole of Terminal siloxane epoxy resin (1), and 15.52 parts by mole of cage siloxane epoxy resin were added into the planetary mixer and mixed with the mixture at a speed of 2000 rpm for 10 minutes. Next, the result was defoamed at a speed of 2200 rpm for 10 minutes, obtaining Composition (10). The components and amounts of Composition (10) were shown in Table 5.

Comparative Example 11

First, 163.3 parts by mole of Terminal siloxane anhydride (1) (serving as hardener) and 0.46 parts by weight of a reaction accelerator (with a trade number of U-Cat 18X, sold by San-Apro) (the total weight of Terminal siloxane epoxy resin (1) and Side-chain siloxane epoxy resin (1) was 100 parts by weight) were mixed by planetary mixer at a speed of 2000 rpm for 5 minutes. After defoaming at a speed of 2200 rpm for 5 minutes, a mixture was obtained. Next, 100 parts by mole of Terminal siloxane epoxy resin (1), and 15.98 parts by mole of side-chain siloxane epoxy resin (1) were added into the planetary mixer and mixed with the mixture at a speed of 2000 rpm for 10 minutes. Next, the result was defoamed at a speed of 2200 rpm for 10 minutes, obtaining Composition (11). The components and amounts of Composition (11) were shown in Table 5.

Comparative Example 12

First, 228.07 parts by mole of methyl hexahydrophthalic anhydride (MHHPA) (serving as hardener) and 0.26 parts by weight (Herein, terminal siloxane epoxy resin (1), side-chain siloxane epoxy resin (1), and cage siloxane epoxy resin was 100 parts by weight) of a reaction accelerator (with a trade number of U-Cat 18X, sold by San-Apro) were mixed by planetary mixer at a speed of 2000 rpm for 5 minutes. After defoaming at a speed of 2200 rpm for 5 minutes, a mixture was obtained. Next, 100 parts by mole of Terminal siloxane epoxy resin (1), and 4.5 parts by mole of side-chain siloxane epoxy resin (1), and 1.47 parts by mole of cage siloxane epoxy resin were added into the planetary mixer and mixed with the mixture at a speed of 2000 rpm for 10 minutes. Next, the result was defoamed at a speed of 2200 rpm for 10 minutes, obtaining Composition (12). The components and amounts of Composition (12) were shown in Table 5.

Comparative Example 13

First, 132.66 parts by mole of Terminal siloxane anhydride (1) (serving as hardener) and 0.52 parts by weight (Herein, terminal siloxane epoxy resin (3), side-chain siloxane epoxy resin (1), and cage siloxane epoxy resin was 100 parts by weight) of a reaction accelerator (with a trade number of U-Cat 18X, sold by San-Apro) were mixed by planetary mixer at a speed of 2000 rpm for 5 minutes. After defoaming at a speed of 2200 rpm for 5 minutes, a mixture was obtained. Next, 100 parts by mole of Terminal siloxane epoxy resin (3), and 4.9 parts by mole of side-chain siloxane epoxy resin (1), and 1.58 parts by mole of cage siloxane epoxy resin were added into the planetary mixer and mixed with the mixture at a speed of 2000 rpm for 10 minutes. Next, the result was defoamed at a speed of 2200 rpm for 10 minutes, obtaining Composition (13). The components and amounts of Composition (13) were shown in Table 5.

Comparative Example 14

First, 136.08 parts by mole of Terminal siloxane anhydride (1) (serving as hardener) and 0.21 parts by weight (Herein, terminal siloxane epoxy resin (4), side-chain siloxane epoxy resin (1), and cage siloxane epoxy resin was 100 parts by weight) of a reaction accelerator (with a trade number of U-Cat 18X, sold by San-Apro) were mixed by planetary mixer at a speed of 2000 rpm for 5 minutes. After defoaming at a speed of 2200 rpm for 5 minutes, a mixture was obtained. Next, 100 parts by mole of Terminal siloxane epoxy resin (4), and 6.31 parts by mole of side-chain siloxane epoxy resin (1), and 6.47 parts by mole of cage siloxane epoxy resin were added into the planetary mixer and mixed with the mixture at a speed of 20(0) rpm for 10 minutes. Next, the result was defoamed at a speed of 2200 rpm for 10 minutes, obtaining Composition (14). The components and amounts of Composition (14) were shown in Table 5.

TABLE 5

| | Comparative Example 10 | Comparative Example 11 | Comparative Example 12 | Comparative Example 13 | Comparative Example 14 |
|---|---|---|---|---|---|
| U-Cat 18X | 0.5 parts by weight | 0.46 parts by weight | 0.26 parts by weight | 0.52 parts by weight | 0.21 parts by weight |
| MHHPA | — | — | 228.07 parts by mole | | |
| Terminal siloxane anhydride (1) | 163.3 parts by mole | 163.3 parts by mole | — | 132.66 parts by mole | 136.08 parts by mole |
| Terminal siloxane anhydride (2) | — | — | — | — | — |
| Terminal siloxane epoxy resin (1) | 100 parts by mole | 100 parts by mole | 100 parts by mole | — | — |
| Terminal siloxane epoxy resin (3) | — | — | — | 100 parts by mole | — |
| Terminal siloxane epoxy resin (4) | — | — | — | — | 100 parts by mole |
| Side-chain siloxane epoxy resin (1) | — | 15.98 parts by mole | 4.5 parts by mole | 4.9 parts by mole | 6.31 parts by mole |
| Cage siloxane epoxy resin | 15.52 parts by mole | — | 1.47 parts by mole | 1.58 parts by mole | 6.47 parts by mole |

Properties Measurement of Cured Product of the Curable Composition

Curable compositions (1)-(8) of Examples 1-8 and Composition (1)-(14) of Comparative Examples 1-14 were subjected to a curing process to form samples individually. Furthermore, Curable compositions (1)-(8) of Examples 1-8 and Composition (1)-(14) of Comparative Examples 1-14 were coated on a flexible substrate (thermoplastic polyurethane substrate) by spin coating to form coatings individually.

Next, the coatings were subjected to a curing process (at a temperature of 160° C., and a time period of 2 hours), obtaining Cured layers (1)-(22). Next, the interface adhesion of Cured layers (1)-(22) was evaluated and the samples were subjected to a tensile recovery test. The results are shown in Table 6. The stretchability is determined according to ASTM D624 by universal tensile machine. When the elongation of sample was greater than or equal to 15%, it was marked with O. When the elongation of sample was less than or equal to 15%, it was marked with X. The tensile recovery test was done on the universal tensile machine. After stretching 500 times, the example was marked with "PASS" when the recoverability was 100%. Otherwise, it was marked with "fail". The interface adhesion of the carbon films was measured in accordance with ASTM D3359 standard tape test.

TABLE 6

| | Example 1 | Example 2 | Example 3 | Example 4 | Example 5 | Example 6 |
|---|---|---|---|---|---|---|
| stretchability | O | O | O | O | O | O |
| interface Adhesion | 5 B | 5 B | 5 B | 5 B | 5 B | 5 B |
| tensile recovery test | pass | pass | pass | pass | pass | pass |

| | Example 7 | Example 8 | Comparative Example 1 | Comparative Example 2 | Comparative Example 3 | Comparative Example 4 |
|---|---|---|---|---|---|---|
| stretchability | O | O | X | X | X | X |
| interface Adhesion | 5 B | 5 B | 5 B | 3 B | 1 B | 4 B |
| tensile recovery test | pass | pass | fail | fail | fail | fail |

| | Comparative Example 5 | Comparative Example 6 | Comparative Example 7 | Comparative Example 8 | Comparative Example 9 | Comparative Example 10 |
|---|---|---|---|---|---|---|
| stretchability | X | X | X | X | X | X |
| interface Adhesion | <1 B | <1 B | <1 B | 5 B | 5 B | 5 B |
| tensile recovery test | fail | fail | fail | fail | fail | fail |

| | Comparative Example 11 | Comparative Example 12 | Comparative Example 13 | Comparative Example 14 |
|---|---|---|---|---|
| stretchability | X | X | X | X |
| interface Adhesion | 5 B | 5 B | 5 B | <1 B |
| tensile recovery test | fail | fail | fail | fail |

As shown in Table 6, when the curable composition of the disclosure (i.e. curable compositions of Examples 1-8) (with specific composition and content) are used to perform a curing process, the obtained cured product exhibits superior stretchability, recoverability, and interface adhesion. As shown in Comparative Examples 1-7, when the composition does not include the first siloxane compound, the second siloxane compound, the third siloxane compound, and the terminal siloxane anhydride simultaneously (or the terminal siloxane anhydride is replaced with MHHPA), the stretchability, recoverability, and interface adhesion of the cured product cannot be enhanced effectively. As shown in Comparative Examples 8-12, when the first siloxane compound, the second siloxane compound, the third siloxane compound, and the terminal siloxane anhydride of composition is not within the specific range described in the disclosure, the cured product exhibits poor stretchability and recoverability. In addition, as shown in Comparative Examples 13-14, when the molecular weight of the terminal siloxane epoxy resin is not within the specific range described in the disclosure, the performance, recoverability, and interface adhesion of the resulting cured product cannot be effectively improved.

It will be clear that various modifications and variations can be made to the disclosed methods and materials. It is intended that the specification and examples be considered as exemplary only, with the true scope of the disclosure being indicated by the following claims and their equivalents.

What is claimed is:
1. A curable composition, comprising:
100 parts by mole of a first siloxane compound represented by Formula (I), wherein n is 8 to 232, wherein $R^1$ is independently $C_{1-3}$ alkyl group;

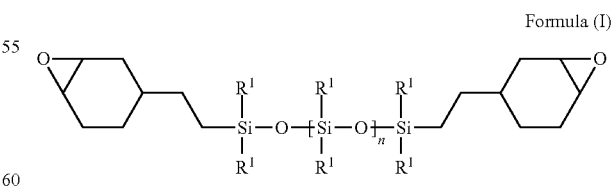

Formula (I)

1 to 15 parts by mole of a second siloxane compound represented by Formula (II), wherein x≥2, y≥2, and x/y is between 0.1 and 3, wherein $R^2$, $R^3$ and $R^4$ are independently $C_{1-3}$ alkyl group;

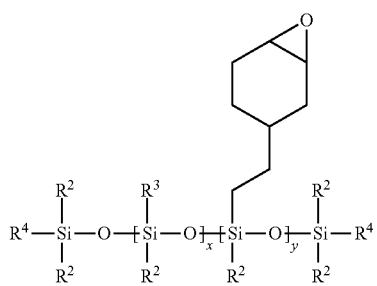

Formula (II)

1 to 15 parts by mole of a third siloxane compound represented by Formula (III); and

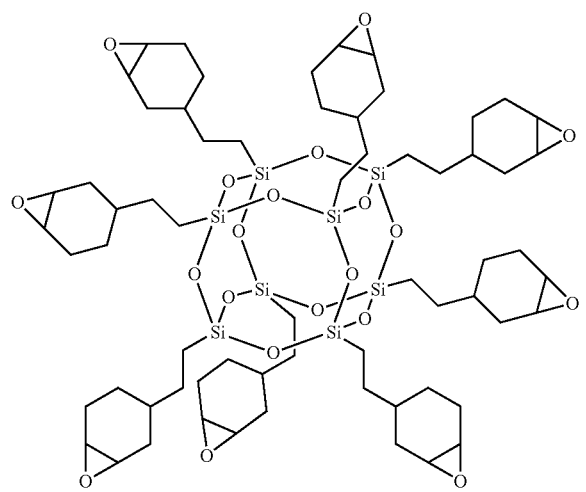

Formula (III)

90 to 250 parts by mole of a curing agent represented by Formula (IV), wherein m is 7 to 230, and $R^5$ is independently $C_{1-3}$ alkyl group

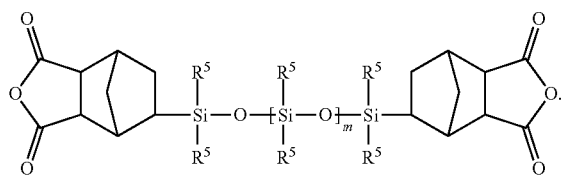

Formula (IV)

2. The curable composition as claimed in claim 1, wherein the first siloxane compound represented by Formula (I) has a weight average molecular weight of 1,000 g/mol to 18,000 g/mol.

3. The curable composition as claimed in claim 1, wherein the second siloxane compound represented by Formula (II) has a weight average molecular weight of 1,800 g/mol to 4,000 g/mol.

4. The curable composition as claimed in claim 1, wherein the curing agent represented by Formula (IV) has a weight average molecular weight of 1,000 g/mol to 18,000 g/mol.

5. The curable composition as claimed in claim 1, further comprising:
   a reaction accelerator, wherein the reaction accelerator has a weight percentage of 0.1 wt % to 1 wt %, based on the total weight of the first siloxane compound, the second siloxane compound, and the third siloxane compound.

6. The curable composition as claimed in claim 5, wherein the reaction accelerator comprises quaternary phosphate, amine, or a combination thereof.

7. The curable composition as claimed in claim 1, further comprising:
   an additive, wherein the additive has a weight percentage of 0.1 wt % to 5 wt %, based on the total weight of the first siloxane compound, the second siloxane compound, and the third siloxane compound.

8. The curable composition as claimed in claim 7, wherein the additive comprises an adhesion promoter, antioxidant, defoamer, levelling agent, stabilizer, or a combination thereof.

9. An electronic device, comprising:
   a substrate; and
   a film covered on the substrate, wherein the film is prepared from the curable composition as claimed in claim 1.

* * * * *